May 20, 1924.

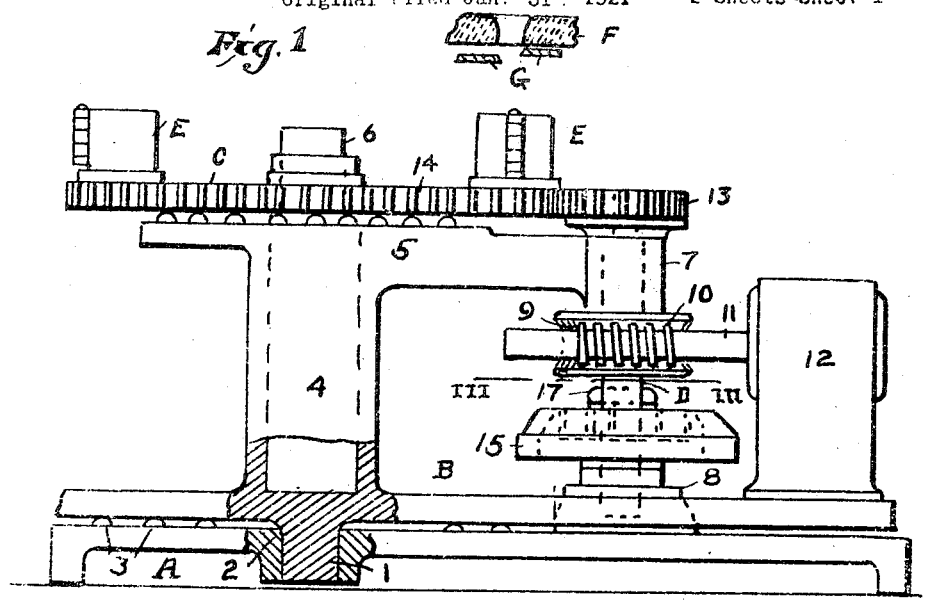
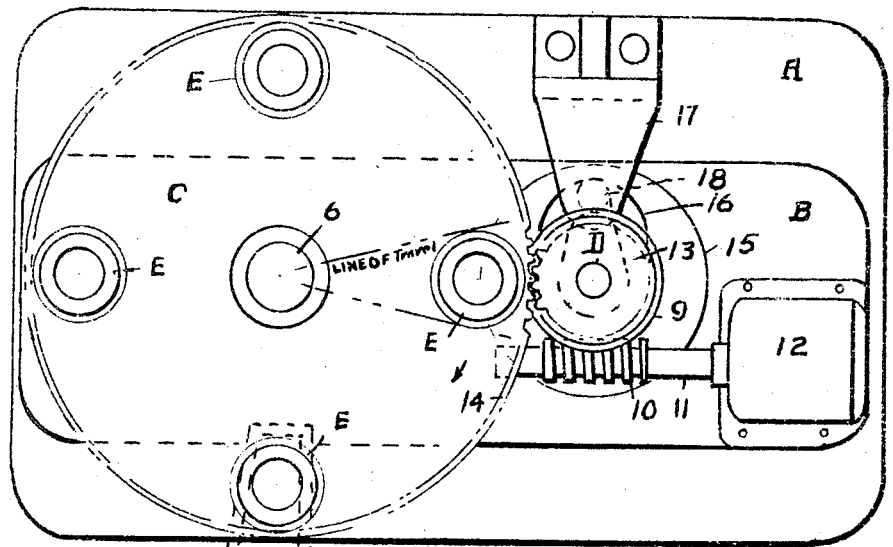
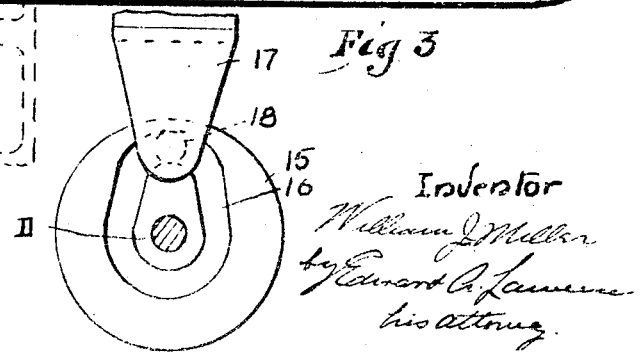

W. J. MILLER

APPARATUS FOR MAKING ARTICLES OF GLASS

Original Filed Jan. 31, 1921    2 Sheets-Sheet 2

Inventor
William J Miller
by Edward A Lawson
his attorney

Patented May 20, 1924.

1,494,438

UNITED STATES PATENT OFFICE.

WILLIAM J. MILLER, OF SWISSVALE BOROUGH, PENNSYLVANIA.

APPARATUS FOR MAKING ARTICLES OF GLASS.

Application filed January 31, 1921, Serial No. 441,170. Renewed March 5, 1924.

*To all whom it may concern:*

Be it known that I, WILLIAM J. MILLER, a citizen of the United States, and residing in the borough of Swissvale, in the county of Allegheny and State of Pennsylvania, have invented or discovered new, useful, and Improved Apparatus for Making Articles of Glass, of which the following is a specification.

My invention comprises a new and improved apparatus for making articles of glass, including the feeding or supplying of molten glass from a flowing stream or other discharge of glass from a tank or other container to the molds, or other receiving receptacle or receptacles, of a glass fabricating mechanism. The objects which I have in view are, inter alia, the increase of production, and the continuous operation of the fabricating mechanism, thus avoiding the necessity for overcoming the inertia in starting and the momentum in stopping.

Another object I have in view is to enable the use, if desired, of a flowing stream of molten glass in feeding, thereby rendering unnecessary the use of feeding mechanism whereby the movement of the molten glass through the discharge orifice is controlled.

In carrying out my invention, I employ a mold support or table which, during the operation of the fabricating mechanism, is moved continuously, preferably in a rotary manner, but the speed of said table relative to a fixed point, such, for instance, to the feed orifice, is variant so that the molds lag in the feeding position.

I prefer to provide shear mechanism or other suitable means for severing or detaching the glass from the discharge orifice at proper intervals to form the individual gathers and to afford an opportunity for shifting the molds or the gathering cup.

The principles of my invention may be put into effect by means of a number of practical embodiments of the same, two of which are shown in the accompanying drawings; which drawings, however, are merely intended as illustrative but not to limit the scope of the invention to the mechanism or instrumentalities shown.

Figure 4:
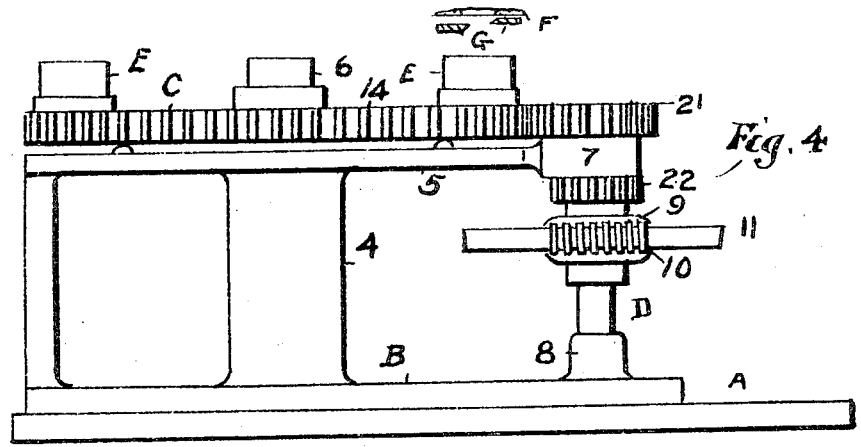
Figure 5:
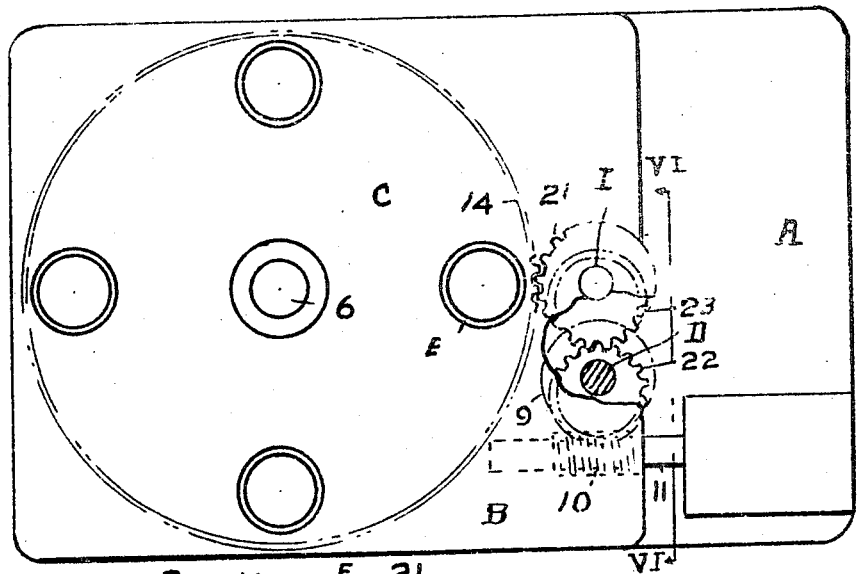
Figure 6:
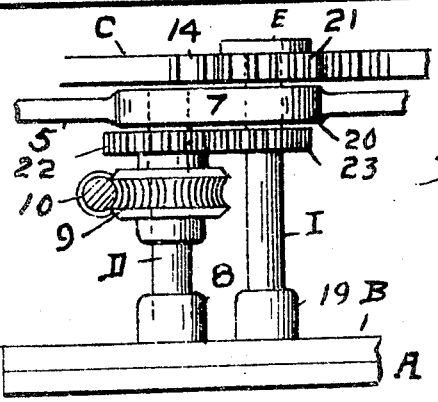

In said drawings, Figs. 1 and 2 are, respectively, an elevation and a plan view of one of the embodiments of the principles of my invention, and Fig. 3 is a detail of the same in section along the line III—III in Fig. 1; Figs. 4 and 5 are, respectively, an elevation and a plan view of a modification, and Fig. 6 is an elevation taken at right angles to Fig. 5, partially in section along the line VI—VI in Fig. 5.

The following is a description of the principles of my invention as the same are illustrated in the drawings, reference being first had to Figs. 1, 2 and 3.

A represents a base, which may be either fixed or portable, but which is stationary during the operation of the mechanism. B is a platform mounted to turn on said base, as by means of the depending journal 1 which is stepped in the bearing 2 of the base, anti-friction members, such as the ball bearings 3 being interposed in suitable raceways between the base and the platform.

The platform B is provided with a column 4, axially alined with the journal 1, and 5 is a horizontally disposed top plate mounted on said column and rigid with the platform. 6 is a post or standard extending upwardly from said top 5 in axial alinement with the journal 1.

C is a mold table rotatably mounted on said post 6, ball bearings or other suitable anti-friction members being interposed in suitable raceways between the mold table C and the top 5.

The top 5 is extended beyond the perimeter of the mold table and provided with a vertically disposed sleeve bearing 7 while the platform B is provided with a step bearing 8 vertically alined with the bearing 7. D is a shaft having its lower end journaled in the bearing 8 and its upper end protruding through the bearing 7. 9 is a worm gear on shaft D meshing with a worm 10 on the shaft 11 of the motor 12 mounted on the platform B. 13 is a pinion mounted on the upper end of the shaft D and meshing with the annular gear 14 mounted perimetrally on the table C.

Thus the mold table C is driven at constant speed in the predetermined direction in relation to the platform B, which is shown as clockwise.

15 is a circular plate mounted on the shaft D, and having its upper face provided with a continuous groove 16 which at one side is concentric with the shaft D and at the other eccentric thereto, in substantially the manner shown in Figs. 2 and 3.

17 is an angular bracket mounted on the base A and extending horizontally over the platform B toward the shaft D, the end of said bracket being provided with a depending pin or stud 18 engaging the groove 16.

It is thus evident that, as the shaft D revolves at constant speed, the platform B will oscillate in relation to the base A, said platform being stationary relative to said base while the concentric portion of the groove 16 is engaged by the stud 18 and being swung first in one direction and then in the other direction as the eccentric portion of said groove is engaged by said stud.

Thus, while the mold table C rotates at a constant speed relative to the platform B, said rotation, relative to a fixed point, such as the feeding point, is variant; because, during the oscillatory movement of the platform in a direction opposed to that of the rotation of the table, the rotary movement of the table is counteracted, rendering the table in effect stationary in relation to a fixed point.

E represents the molds mounted in spaced relation on the table C.

In the drawings I have shown at F an orifice for the emission of a freely flowing stream of molten glass, but any type of feeder may be advantageously used in connection with my invention.

G represents a pair of coacting shear blades, mechanically operated by any of the numerous shear mechanisms known in the art, and adapted to close together at properly regulated intervals to sever the neck of glass at or below the orifice.

The mechanism is assembled so that during the net or effective rotary movement of the mold table, the molds E are in turn positioned under the discharge orifice to receive a gather, and the oscillations of the platform result in rotating each mold, or causing the same to lag, in the gathering position until the proper amount of glass has moved down out of the discharge orifice. At this moment the shears close, severing the gather, which drops down into the waiting mold. A net or effective rotation of the table then occurs positioning a fresh mold under the orifice before the resumed flow of glass from the orifice reaches the level of the top of the mold.

The lag or rest of the molds may be utilized also for a fabricating operation. Thus at H in Fig. 2 I have indicated a pressing mechanism under which the mold, which previously received a gather, is shown positioned.

Referring now to Figs. 4, 5 and 6, in the therein illustrated embodiment of the principles of my invention, the platform B is stationary, being attached to or integral with the base A, and the shaft D does not protrude above the top 5; said shaft being driven at constant speed by means of the worm gear 9, worm 10 and motor shaft 11, as in Figs. 1 and 2.

I represents a second shaft parallel with shaft D, having its lower end stepped in the bearing 19 on platform B, while its upper end protrudes through the bearing 20 of the top 5. The upper end of the shaft I is provided with a pinion 21 which is in mesh with the perimetral gear 14 of the mold table C. The shafts D and I are provided with complementary, intermeshing, eccentric gears 22 and 23, respectively, whereby a fast and slow, or variant rotary movement is imparted to the shaft I and by the latter to the mold table C, so that the table turns at a relatively rapid rate in bringing the molds E in turn into the feeding position, but the table is materially slowed down but not completely halted while a mold is in the feeding position; which position the molds traverse at rate of speed sufficiently reduced to provide the necessary lag for them to receive the gathers.

It is evident that in both of the embodiments above described, the movement of the table or mold supports is continuous, thus avoiding sudden or complete stoppages of the same. This is a great advantage, inasmuch as the mold supports together with the molds are very heavy and their frequent stoppage of necessity is a great strain on the fabricating mechanism.

Also the frequent and quick starting of the mold support in a machine characterized by an intermittent movement of the mold support, requires the quick application of a relatively great force which requires excessive power which is injurious to the mechanism.

As already stated, any method of discharging the glass from the tank or other container may be used; such as a freely flowing stream or with means controlling or otherwise retarding or husbanding the glass during the intervals required to shift the molds or the gathering cup, as the case may be, or the shears or other means for severing the glass may be positioned close enough to the discharge orifice to chill the sheared neck at the mouth of the orifice, and in this manner temporarily delay the flow of the glass.

What I desire to claim is:—

1. In combination with a glass fabricating mechanism provided with a continuously moving mold support having a plurality of molds mounted thereon, connections for varying the movement of said support whereby the molds are in turn caused to lag in the feeding position to receive the gathers.

2. In a glass fabricating mechanism, the combination of a plurality of molds, a continuously moving mold support upon which said molds are mounted and by whose movement said molds are brought into a given position, and connections whereby the speed of travel of said support relative to said position is varied whereby the molds are caused to lag in turn relative to said position.

3. In a glass fabricating mechanism, the combination of a rotary mold support continuously rotated about its axis, a plurality of molds mounted on said support and brought into a given position in turn by the movement of said support, and connections whereby the speed of rotation of said support relative to said position is varied whereby the molds are caused to lag relative to said position.

4. In a glass fabricating mechanism, a platform, a mold table mounted on said platform, means for rotating said table at a constant speed relative to said platform, and connections for moving said platform whereby the molds are caused in turn to lag in the feeding position to receive the gathers.

5. In a glass fabricating mechanism, a platform, a mold table mounted on said platform, means for rotating said table at a constant speed relative to said platform, and connections for oscillating said platform whereby the molds are caused to lag in the feeding position to receive the gathers.

6. In a glass fabricating mechanism, a platform, a mold support mounted on said platform, means for moving said support at a constant speed relative to said platform, and connections for moving said platform in a direction opposed to the movement of the mold support whereby the molds are caused in turn to lag in the feeding position to receive the gathers.

7. In a glass fabricating mechanism, a platform, a mold support mounted on said platform, connections for moving said mold platform, connections for moving said mold support at a constant speed relative to said platform, and means for intermittently moving said platform in a direction opposed to the movement of said mold support whereby the molds are caused in turn to lag in the feeding position to receive the gathers.

8. In a glass fabricating mechanism, a continuously moving mold support having a plurality of molds mounted thereon, and connections for varying the speed of said mold support whereby the molds are caused in turn to lag in the feeding position to receive the gathers.

9. In a glass fabricating mechanism, a mold support having a plurality of molds mounted thereon, and connections for imparting a continuous but variant movement to said mold support whereby the molds are caused in turn to lag in the feeding position to receive the gathers.

10. In a glass fabricating mechanism, a rotary mold table having a plurality of molds mounted thereon, and means for imparting continuous but variant movement to said table whereby the molds are caused in turn to lag in the feeding position to receive the gathers.

Signed at Pittsburgh, Pa., this 27th day of January, 1921.

WILLIAM J. MILLER.